United States Patent [19]

Hayashi

[11] Patent Number: 4,747,690

[45] Date of Patent: May 31, 1988

[54] KNEADING APPARATUS FOR BREAD DOUGH AND THE LIKE AND A METHOD OF CONTROLLING THE QUALITY THEREOF DURING KNEADING

[75] Inventor: Torahiko Hayashi, Utsunomiya, Japan

[73] Assignee: Rheon Automatic Machinery Co., Ltd., Utsunomiya, Japan

[21] Appl. No.: 923,642

[22] Filed: Oct. 27, 1986

[30] Foreign Application Priority Data

Oct. 29, 1985 [JP] Japan .................. 60-242292

[51] Int. Cl.⁴ .................................... B01F 15/00
[52] U.S. Cl. ................................ 366/98; 366/141; 366/142; 366/151
[58] Field of Search ............. 366/69, 96, 97, 98, 366/99, 100, 141, 142, 143, 151, 249, 251, 279, 18, 65; 99/348

[56] References Cited

U.S. PATENT DOCUMENTS 3,888,470  6/1975  Leisenberg .................. 366/69
4,002,891  1/1977  Porter ........................ 366/98
4,076,220  2/1978  Nakashima .................. 366/69
4,538,509  9/1985  Ojima ........................ 366/98
4,544,279  10/1985  Rudolph ..................... 366/141

FOREIGN PATENT DOCUMENTS 61-219333  9/1986  Japan .

*Primary Examiner*—Robert W. Jenkins
*Attorney, Agent, or Firm*—Finnegan, Henderson, Farabow, Garrett & Dunner

[57] ABSTRACT

An apparatus and method for controlling the quality of bread dough is provided. Instruments such as a strain gauge, a thermometer, a weighing device, and a pH meter are disposed, and values measured with these instruments are indicated on a display for monitoring.

By comparing the temperature, weight, and pH values of the dough and strain caused on an agitator with control values stored in a computer, undesirable products can be eliminated and dough temperature can be adjusted during the kneading operation.

2 Claims, 7 Drawing Sheets

FIG. 3

KNEADING APPARATUS FOR BREAD DOUGH AND THE LIKE AND A METHOD OF CONTROLLING THE QUALITY THEREOF DURING KNEADING

BACKGROUND OF THE INVENTION

1. Field of the Invention

This invention relates to an apparatus for kneading materials such as bread dough and the like and a method of controlling the quality of the materials during kneading, and particularly to an apparatus and method for kneading bread dough and the like in a mass production plant where quality control is required.

2. Description of Prior Art

To control the quality of bread dough and the like in kneading, the operator measures physical properties of the dough, as for instance, its viscosity, temperature, or pH values, as he feels it necessary to measure them on a case-by-case basis, but the measuring method has not been organized or systematic, so that no sufficient control of quality has been available to detect inferior quality before products are manufactured. The conventional method fails to provide instantaneous observation of all required parameters of kneading conditions, so that there have been occurrences of failure. Furthermore, the inferior quality of products are often discovered only after they are manufactured, thereby causing damage.

Japanese Early-Patent Publication No. 219333/61 teaches a method of monitoring changes in kneading resistance using the trend in the chronological change of electric power values and of the amplitudes of waves of electric power values and stopping kneading where measured values reach approximately the highest point. This method aims only at the change in kneading resistance, and other parameters, such as the temperature or the pH value of a product, are disregarded. Therefore, the kneading operation cannot be effectively controlled.

SUMMARY OF THE INVENTION

It is an object of this invention to provide an apparatus and method for controlling the quality of bread dough and the like that is subjected to kneading.

It is another object of this invention to provide an apparatus and method for controlling the kneading conditions, as, for example, the amount of materials to be added in a kneader, the kneading resistance of the kneader, and the temperature or the pH value of the dough, during the kneading operation.

It is still another object of this invention to provide an apparatus and method by which the kneading conditions can be chronologically displayed so that the operator can take action to correct irregularities in the kneading operation.

It is a further object of this invention to provide an apparatus and method by which control values of kneading conditions are stored in a computer, and the actual values of kneading conditions are compared with the control values to produce quality products.

In one aspect of this invention, a kneading apparatus for controlling the quality of bread dough and the like is provided, which comprises a kneading vessel, an agitator, measuring instruments consisting of a strain gauge mounted on said agitator, a thermometer and a pH meter mounted on the inner surface of said kneading vessel, and a weighing device mounted relative to said kneading vessel, said measuring instruments being adapted to begin their measurement as soon as the kneading begins, and means for displaying the individual chronologically measured values.

In another aspect of this invention, a kneading apparatus is provided, which comprises a kneading vessel, an agitator, measuring instruments consisting of a strain gauge mounted on said agitator, a thermometer and a pH meter mounted on the inner surface of said kneading vessel, a weighting device mounted relative to said kneading vessel, said measuring instruments being adapted to begin measurement as soon as the kneading operation begins, and a computer adapted to store measurement data, compare individual measured values with control values to find differences between them and make logical decisions on the basis of previously stored data, thereby directing the best rotation speed of the agitator, directing temperature corrections, indicating charging of any wrong material, and deciding the duration and end of the kneading operation.

In still another aspect of this invention, a method of controlling the quality of bread dough and the like during kneading is provided, which comprises the steps of continuously and simultaneously measuring chronological changes of the kneading resistance value, pH value, temperature value, and weight value, of dough being kneaded, monitoring the thus obtained measurements, adjusting or changing the kneading conditions as required, and stopping the kneading operation when it is judged completed.

This invention can instantaneously monitor four parameters, namely, kneading registance, temperature, pH value, and weight of dough, thereby adjusting kneading conditions such as kneading time and angular speed of the drive device, to obtain high quality bread dough.

Furthermore, a computer provided in the kneading apparatus of this invention stores chronological control values of strain, temperature, pH value and weight of the dough, and compares the measured values with the control values to determine the optimum kneading time, thereby controlling the quality of the bread dough.

DESCRIPTION OF THE PREFERRED EMBODIMENT

The first embodiment of this invention will now be described by referring to FIGS. 1 and 2.

Figure 1:
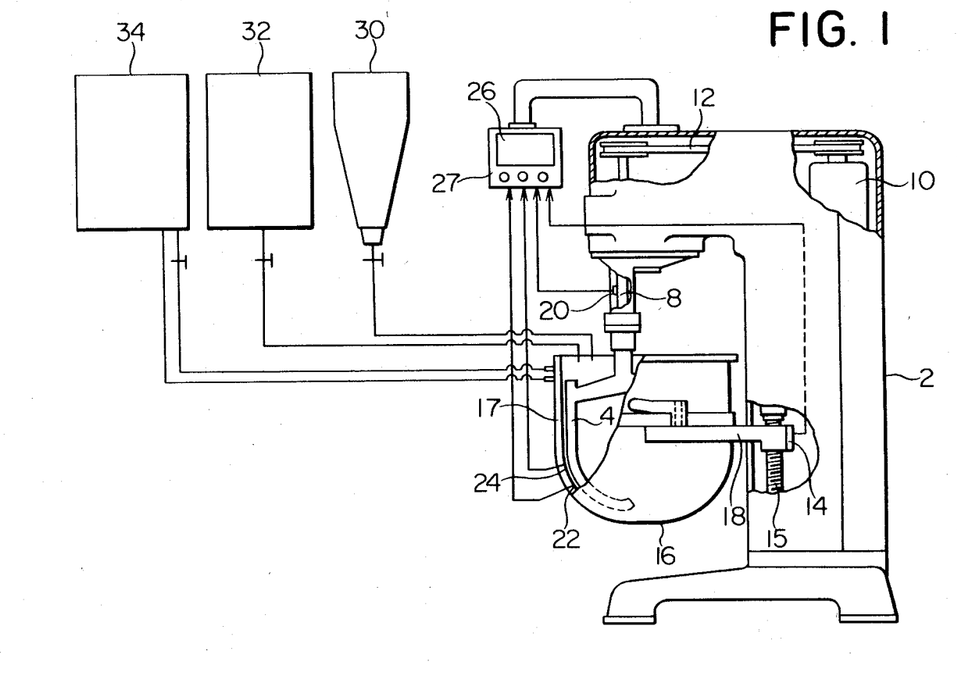
FIG. 1 is a schematic, partially cut away, elevational view of a first embodiment of this invention.

In FIG. 1 a base 2 is provided with a drive device 10 for rotating an agitator 4, a vessel 16 having a jacket 17, and an actuating device 27 where a display device 26 is arranged. The vessel 16 is supported by a bracket 18 which is adapted to vertically move with a threaded rod 15. The rod 15 is rotatably mounted on the base 2 and rotated by a handle (not shown) so as to vertically move the bracket 18 to adjust the position of the vessel 16. The agitator 4 is fixedly connected to one end of rotating input shaft 8 which is rotated through a belt 12 by the drive device 10. In the inner surface of the vessel 16, a sensor 22 of a thermometer and a sensor 24 of a pH meter are provided, which sensors transmit signals indicative of temperatures and pH values to a display device 26 through respective amplifiers accomodated in the actuating device 27. On the surface of the rotating input shaft 8, a strain gauge 20 is disposed, which transmits signals indicative of the strain of the rotating input shaft 8 to the display device 26. A weighing device 14 is mounted on one end of the bracket 18 and senses the weight of the vessel 16 and transmits signals indicative of the weight of the vessel 16 to the display device 26.

When materials, for example, wheat flour and water, are added from a material tank 30 and a water tank 32, respectively, in the vessel 16, and the drive device 10 is started, the actuating device 27 is energized. The actuating device 27 causes the sensors 22 and 24, the strain gauge 20, and the weighing device 14 to measure the pH values, temperatures, strain, and weight of the materials which are to be converted into bread dough. The values measured are transmitted as electrical signals to the display device 26. An example of the output, values measured versus time, depicted on the screen of the display device 26, is shown in FIG. 2, in which the line with the reference symbol (a) represents the chronological change of the weight of the materials, which weight is obtained by subtracting the weight tare of the vessel from the gross weight, the line with the reference symbol (b) represents the chronological change of the strain of the rotating input shaft 8, the line with the reference symbol (c) represents the chronological change of the temperature of the materials, and the line with the reference symbol (d) represents the chronological change of the pH value of the materials.

A step-wise climb of line (a) indicates charges of the materials.

Line (b) indicates the chronological change in the strain caused on the agitator due to the resistance from the materials subjected to kneading. When the materials are kneaded, it is observed that they go through the "pick-up" stage, where the materials are mixed; the "clean-up" stage, where the materials start to agglomerate; the "development" stage, where the gluten in the wheat flour develops and forms a gel as a whole; and the "let-down" stage, where the kneading destroys the gel structure.

The kneading of the bread dough is preferably stopped at the stage of "development." If kneading is stopped before or after this stage, good quality bread can not be produced.

The strain on the agitator due to kneading is low at the "pick-up" stage. Very sharp vibrations of the strain value start to appear on the display device a short time before the start of the "clean-up" stage. When the kneading reaches the "development" stage, the strain values are on a relatively smooth plateau. At the "let-down" stage, the strain value starts to decrease.

The length of time of and the strain values in each stage of kneading vary depending on the composition of the materials used. If the strain value starts to decrease earlier than in a standard time frame, it may indicate an error in the selection of the type of wheat flour and may result in an inferior product. In this invention, when the data shows that the strain on the agitator is outside the control value range, the kneading operation may be stopped at that point.

In this invention, the increase of viscosity due to the growth of the gluten structure or gel structure in the dough is sensed as strain which the agitator receives from the dough while being driven. In this embodiment, the strain is measured by the strain gauge 20 disposed on the rotating input shaft 8. However, the gauge 20 may also be disposed on any portions of a drive system for driving the agitator.

Since the kneading conditions, the amount of materials, the strain, the temperature, and the pH value, are shown on the display device 26, the operator can stop the kneading operation when the values shown on the display device are in the desired range. If abnormal phenomena occur on the display device, the operator can take relevant action. When the weight of the materials is insufficient, a necessary amount is added.

When the materials are mixed, the temperature rises in most cases. However, there are cases where the temperature has to be controlled depending on the type of product, such as frozen bread and pastry dough. The chronological change of the temperature in the kneading of the materials for such products is an important parameter for the production of good quality products.

If the temperature exceeds a desired value, the vessel is cooled by introducing a coolant such as water, oil, and gases from a coolant tank 34 into the jacket 17 of the vessel, until the temperature decreases to the desired value.

When the temperature is less than the desired value, the vessel is heated by a heater (not shown), until the temperature increases to the desired value.

Figure 2:
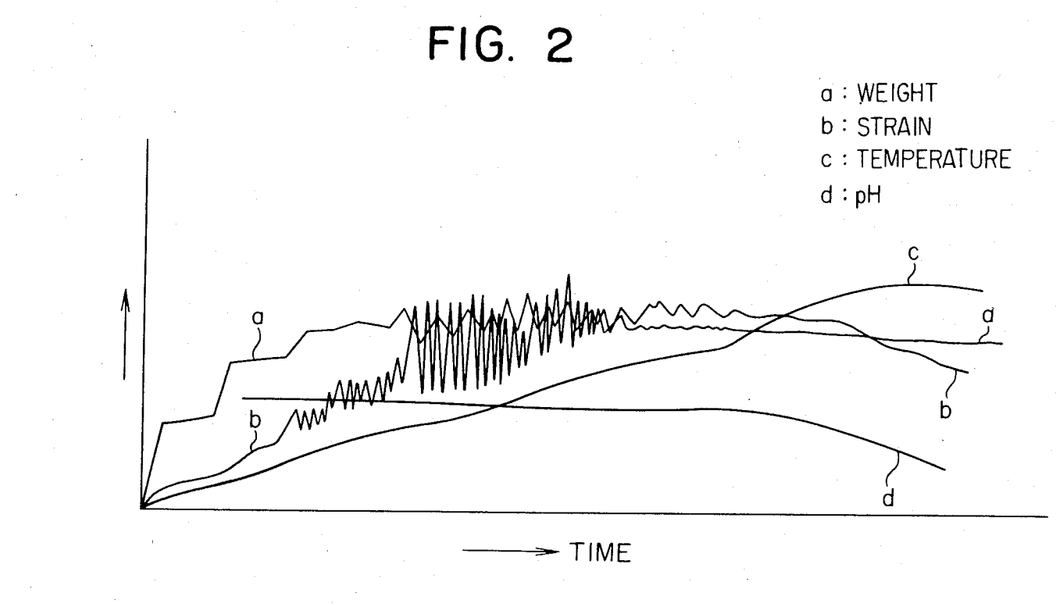
FIG. 2 is an example of a set of curves plotted on a display device of the first embodiment of this invention.

The graph in FIG. 2 contains curves, for the weight, strain, temperature and the pH value, where the abscissa shows the time and the ordinate shows those values.

In this embodiment, the necessary conditions for kneading the dough can be obtained by a simple method and apparatus. According to this embodiment, it is possible to observe the change in the physical properties of the dough during the kneading operation and to assess the quality of the dough product before the completion of the kneading operation. It is also possible to change the kneading conditions before the operation ends to improve the quality of the kneaded products. The method and apparatus of this embodiment can avoid the damage caused by the conventional kneading operation where the inferior quality of the product has often been discovered only after the forming of baking operation. The method and apparatus of this embodiment also makes it possible to control the quality of the product to produce products of uniform and superior quality.

A second embodiment of this invention will now be described by referring to FIGS. 3, 4, 5, 6, and 7.

Figure 3:
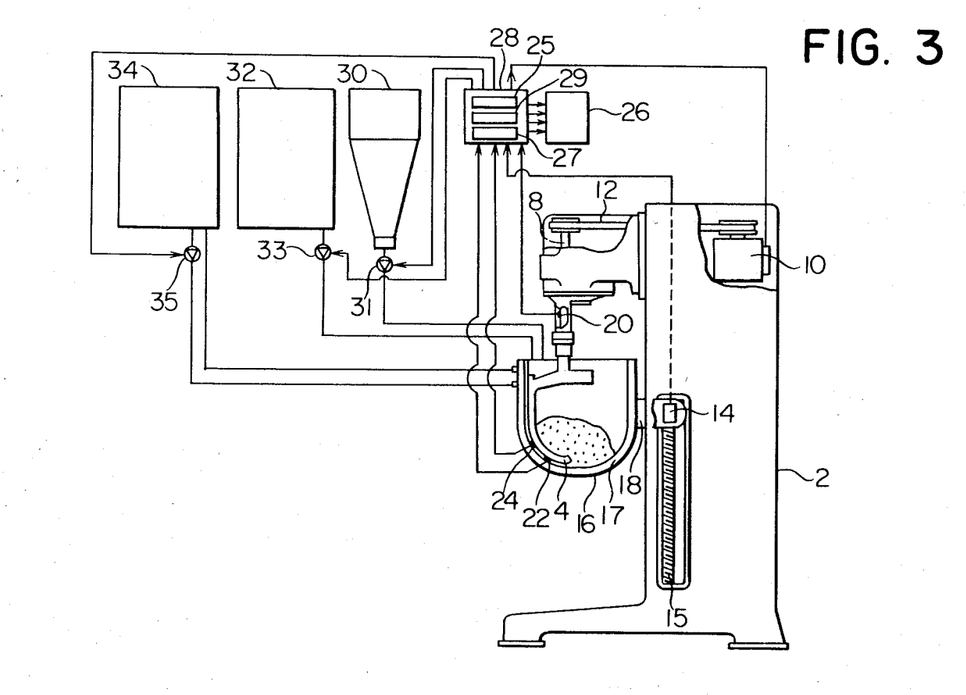
FIG. 3 is a schematic partially cut away, elevational view of a second embodiment of this invention.

In FIG. 3, a kneading apparatus similar to the apparatus described in the first embodiment is illustrated, and a computer control device 28 and valve devices 31, 33, and 35 are further described.

The computer control device 28 includes the actuating device 27, a storing device 29, and a comparator 25.

In this embodiment, temperature regulators (not shown) are provided between the comparator 25 and the valve device 35, and between the comparator 25 and a heater (not shown) for heating the dough, to control the temperature of the dough.

These regulators control the temperature of the dough in accordance with a signal transmitted from the comparator 25.

The storing device 29 is for storing control values of weight, strain, temperature, pH of the dough, a standard kneading time, and a program to calculate extension or reduction of the remaining time required for kneading the dough when the strain measured becomes higher or lower than the range of control values.

The range of control values are generally determined based on values measured by a number of tests run on the bread dough, to which values allowance values are added to establish a range of control values.

The comparator 25 compares the values transmitted from the measuring devices with the range of control values stored in the device 29.

When the weight values of the dough is less than the lower limit of the range of control values, the comparator transmits a signal to the valve devices 31 or 33 to open the valve or valves to introduce a material from the material tank 30 or water from the water tank 32 into the vessel 16 until the measured values reach the range of control values.

When the temperature of the dough becomes higher than the range of control values, the comparator transmits a signal to the temperature regulator to actuate the valve devices 35 to open the valve and introduce a coolant from the coolant tank 34 into the jacket 17 of the vessel 16 until the temperature of the dough decreases to the range of control values.

When the temperature of the dough is lower than the lower limit of the range of the control values, the comparator transmits a signal to the temperature regulator to actuate the heater to heat the vessel until the temperature of the dough increases to exceed the lower limit of the range of the control values.

When the measured value remains outside the range of control values for a predetermined time stored in the storing device, the comparator transmits a signal to stop the drive device to eliminate the material from the kneading vessel.

When the pH value measured deviates from the control values, the operator can take action to change chemical conditions in the vessel.

Figure 4:
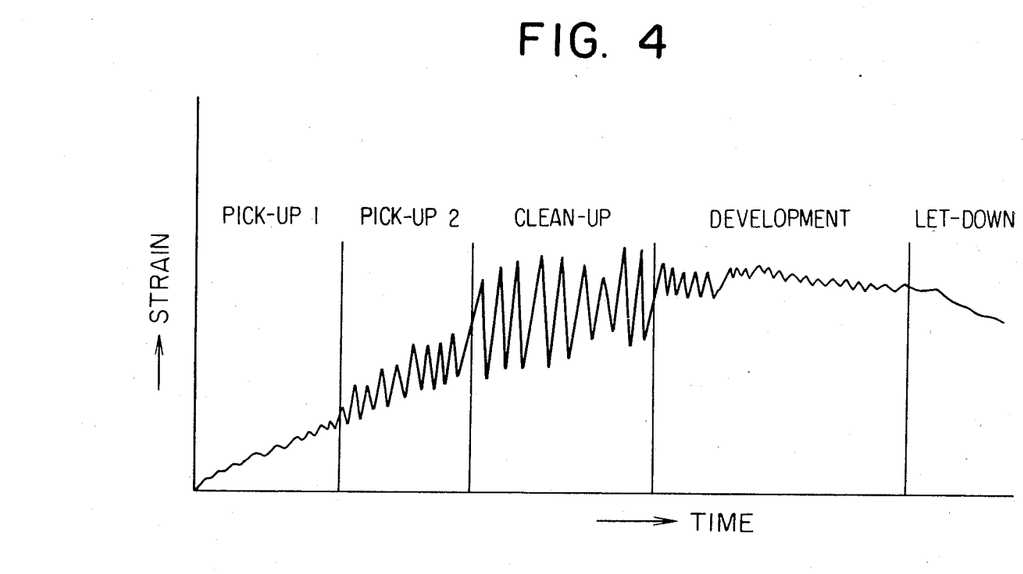
FIG. 4 is a curve of strain versus time plotted on a display device, for determining control values.

In FIG. 4 there is shown a curve of strain versus time plotted on a display device, of a typical sample of dough, for providing a range of control values of strain.

As aforementioned, the kneading process of the dough can be divided into four stages: the pick-up stage, the clean-up stage, the development stage, and the let-down stage. The pick-up stage is further divided into a first pick-up stage and a second pick-up stage.

In the pick-up stage, the materials added into the vessel are mixed by the agitator, and the strain on the agitator gradually increases. The amplitude of the strain measured appears indistinct in the first pick-up stage, but is clearly visible in the second pick-up stage.

The rise of strain values is due to the gel formation in the dough, which gel formation indicates the formation of the gluten structure.

In the clean-up stage, the magnitude of the strain amplitude increases considerably. In the development stage, the strain remains on a plateau while the magnitude of the strain amplitude decreases visibly.

In the let-down stage, the value of the strain decreases, and the amplitude of the strain is not observed because the gel formed in the dough begins to be destroyed.

Figure 7:
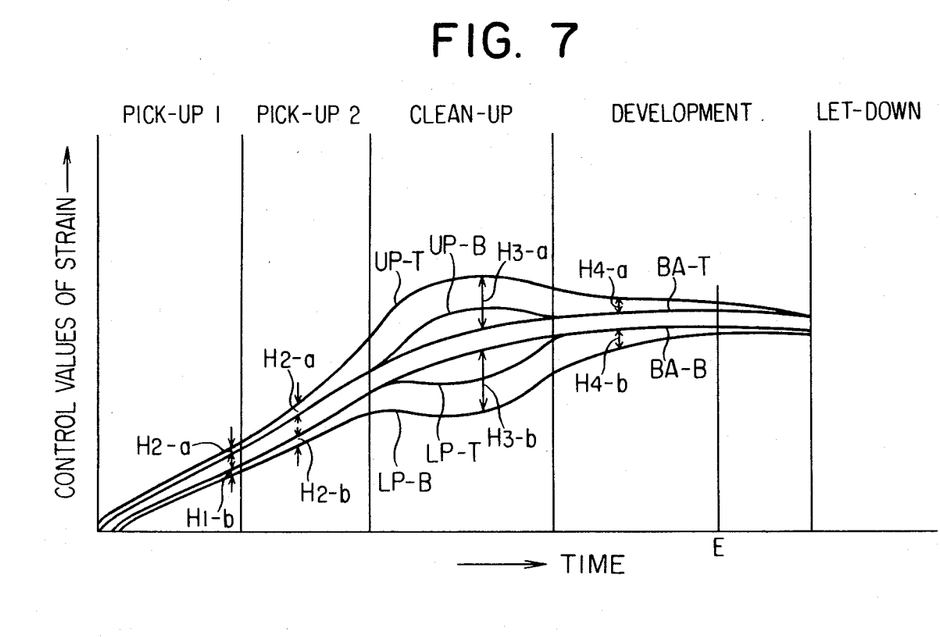
FIG. 7 shows curves representing control values of strain.

It is preferable to discontinue the kneading in the development stage, well in advance of the let-down stage, for instance, at a point E in the development stage as shown in FIG. 7.

A manner of determining the range of control values of strain will now be described below.

Figure 5:
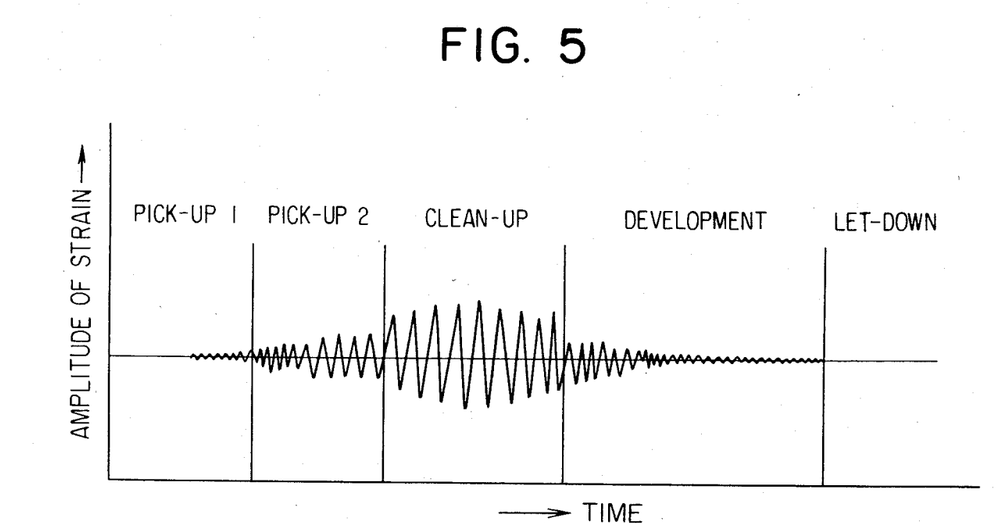
FIG. 5 is a curve in which the amplitudes of the strain in FIG. 4 are symmetrically plotted about a horizontal line.
Figure 6:
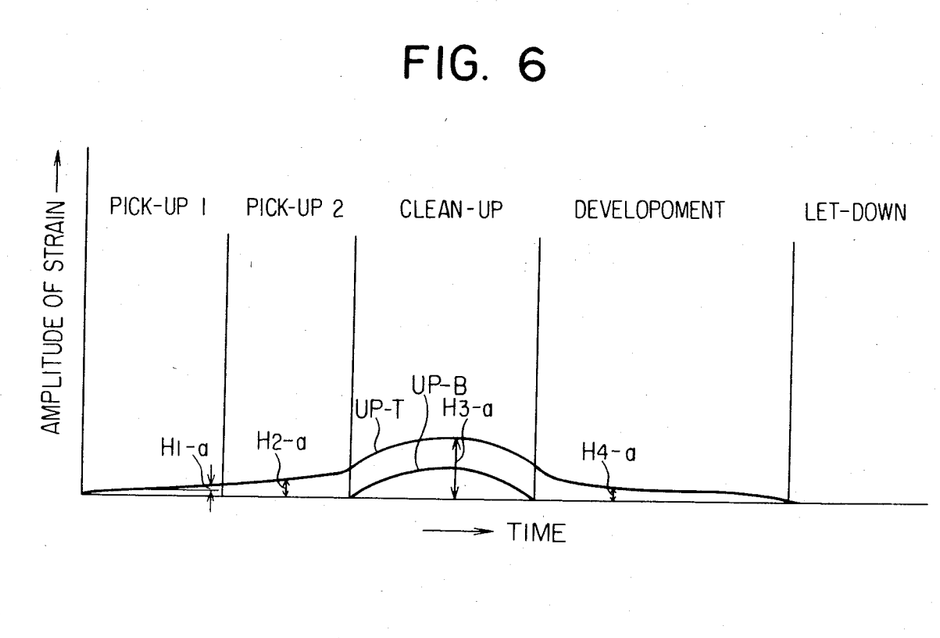
FIG. 6 is a curve formed by tracing the upper peaks of the amplitudes of strain in FIG. 5.

The pattern of the amplitude of strain in FIG. 4 is modified to symmetrically depict the amplitude of strain about a horizontal line and plotted in FIG. 5. Appropriate allowance values are added to values of each peak of the amplitude, and the upper side peaks of the thus modified values of peaks are traced so as to give a curve of UP-T as shown in FIG. 6. The reference symbol UP-T means the top limit of allowable upper peaks of the amplitude of strain. The upper peak of amplitude of strain measured must not exceed the UP-T.

In the storing device 29, values of the UP-T in each stage are stored at regular intervals. The intervals may be in the order of a second or a fraction of a second.

H1-a, H2-a, H3-a, and H4-a mean control values of amplitude of strain at optional times in each stage, which values are to be compared with the values of measured strain at the corresponding times. A reference symbol UP-B means the bottom limit of the upper peak of the amplitude of strain in the clean-up stage.

In this stage, the amplitude of strain must appear vehemently. Therefore, the values of upper peaks of amplitude of strain must be between the UP-T and the UP-B.

From the chart representing the amplitude of strain of the typical sample of dough in FIG. 5, the average values of the strain at each measuring point are calculated to give a trend line of the strain, and to which average values appropriate allowance values are added so that the range of control values of strain is obtained. This range is shown by the curves BA-T and BA-B in FIG. 7. The reference symbol BA-T means a top limit of the range of allowable strain values, and the BA-B means a bottom limit of the range of allowable strain values.

Curves UP-T and the UP-B in FIG. 7 are plotted from the chart in FIG. 6 to be piled up on curve BA-T.

Similarly a curve LP-T means the top limit of allowable lower peaks and a curve LP-B means the bottom limit of allowable lower peaks. These curves are plotted to suspend from curve BA-T.

Reference symbols H1-b, H2-b, H3-b, and H4-b mean control values of amplitude of strain at the same points as the points where H1-a, H2-a, H3-a, and H4-a are indicated, respectively.

The measured values of strain must be between BA-T and BA-B, and the values of upper peaks of amplitude must be between UP-T and BA-T in the pick-up stage and the development stage. The values of upper peaks of amplitude must be between UP-T and UP-B in the clean-up stage, and the lower peaks of amplitude must be between LP-T and LP-B.

When the kneading starts, the comparator begins to compare the measured values of strain with the control values.

When the measured values are within the range of control values at each predetermined measuring point, the comparator provides the next control values, and the kneading continues.

If the measured values deviate from the above-mentioned range of control values, the comparator transmits a signal to stop the drive device, or calculates a relevant time for subsequent kneading based on a logical decision derived from a program stored in the computer.

The comparator simultaneously compares each time the measured values, the average value of strain, an upper peak value of amplitude, and a lower peak value of amplitude, with the control values.

When the kneading proceeds to point E in the development stage, the comparator transmits a signal to stop the drive device, in accordance with a time program stored in the storing device.

In this case the resultant product has a desired quality.

The display device 26 indicates measured values as well as control values during kneading, but this display device can be omitted if the kneading is fully automated.

Although the control values for kneading materials are shown as a standard diagram in FIG. 7, the time required for each stage varies depending on the kind of wheat flour and materials, and their composition.

Further, the temperature, pH value, and the amounts of salt, sugar, and water, affect the time necessary for kneading. Namely, an increase of the temperature and a decrease of the pH value shorten the time for kneading. An increase of the amount of the salt also shortens the time for kneading. When materials absorb less water, the time for kneading, especially, the time up to the development stage, is relatively short.

To the contrary, a decrease in the temperature of the material and an increase in the amount of sugar extend the time for kneading. Further, when the material absorbs much water, the time for kneading tends to extend.

Therefore, when the strain values measured do not reach the range of control values at the development stage within the standard time due to an inadequate formulation, the development can be promoted by increasing the temperature of the material.

On the contrary, when the measured strain value is within the range of control values, the comparator calculates the relevant kneading time and transmits a signal to stop the drive of the kneader.

Thus, the computer compares the individual measured data with their standard values, to find differences between them, and makes logical decisions on the basis of previously stored data, thereby directing the best rotation speed of the agitating rod, directing a temperature correction that must be timely made to end the kneading operation at a proper temperature, indicating any shortage of a material or materials or charging of a wrong material, directing a charge in the duration of the kneading operation, deciding the point at which to end the kneading operation, and directing the kneading operation to stop.

According to this embodiment, the following technical effects are obtained:

The kneading conditions are easily monitored with the display device during kneading, thereby avoiding inadequate weighing of materials, an excessive temperature increase, damage to the gluten structure, etc.

The kneading operation of the bread dough and the like can be automatically controlled.

Bread dough having an uniform and well-developed gluten structure is automatically produced.

By the apparatus and method of this invention, described above, the quality of dough that will be produced can be predicted during the kneading operation. Therefore, to attain the desired result, the operator can change or add a material or materials midway through the kneading operation, or take the necessary measures to correct an environmental factor, such as the temperature, thereby preventing rejects. Further, on the basis of stored data, the computer automatically adjusts the rotation speed of the agitator of the kneading apparatus. Also, the computer decides when the kneading operation should end, and then automatically stops the kneading operation.

I claim:

1. A kneading apparatus for controlling the quality of bread dough and the like during kneading, comprising a kneading vessel, an agitator, measuring instruments consisting of a strain gauge mounted on said agitator, a thermometer and a pH meter mounted on the inner surface of said kneading vessel, and a weighing device mounted relative to said kneading vessel, said measuring instruments being adapted to begin their measurement as soon as the kneading begins, and means for displaying the individual chronologically measured values.

2. A kneading apparatus comprising a kneading vessel, an agitator, measuring instruments consisting of a strain gauge mounted on said agitator, a thermometer and a pH meter mounted on the inner surface of said kneading vessel, a weighing device mounted relative to said kneading vessel, said measuring instruments being adapted to begin measurement as soon as the kneading operation begins, and a computer adapted to store measurement data, compare individual measured values with control values to find differences between them and make logical decisions on the basis of previously stored data, thereby directing the best rotation speed of the agitator, directing temperature corrections, indicating charging of any wrong material, and deciding the duration and end of the kneading operation.

* * * * *